United States Patent [19]

Feder

[11] Patent Number: 5,216,738
[45] Date of Patent: Jun. 1, 1993

[54] FIBER OPTIC BUNDLE AND METHOD OF MANUFACTURE

[75] Inventor: Peretz M. Feder, Englewood, N.J.

[73] Assignee: Photon Imaging Corp., S. Plainfield, N.J.

[21] Appl. No.: 863,587

[22] Filed: Apr. 3, 1992

[51] Int. Cl.$^5$ .............................................. G02B 6/00
[52] U.S. Cl. .................................. 385/114; 385/121; 385/116
[58] Field of Search ....................... 385/114, 115–120, 385/121

[56] References Cited

U.S. PATENT DOCUMENTS 4,026,693  5/1977  Sato ..................................... 385/121

Primary Examiner—John D. Lee
Assistant Examiner—John Ngo
Attorney, Agent, or Firm—Herbert M. Shapiro

[57] ABSTRACT

A bundle of optical fibers having a linear first face and an area second face includes a frame for constraining the linear face to a geometry which compensates for any potential misalignment of pixels due to the movement of an electrostatic drum juxtaposed with the linear end. The fiber optic bundle is made of ribbons of optical fibers. The frame includes an elongated opening of a shallow sawtooth geometry where each "tooth" has a width to accept a ribbon and an offset at one end to raise the respective edge of the ribbon in a direction opposite to that in which the drum is moving.

8 Claims, 1 Drawing Sheet

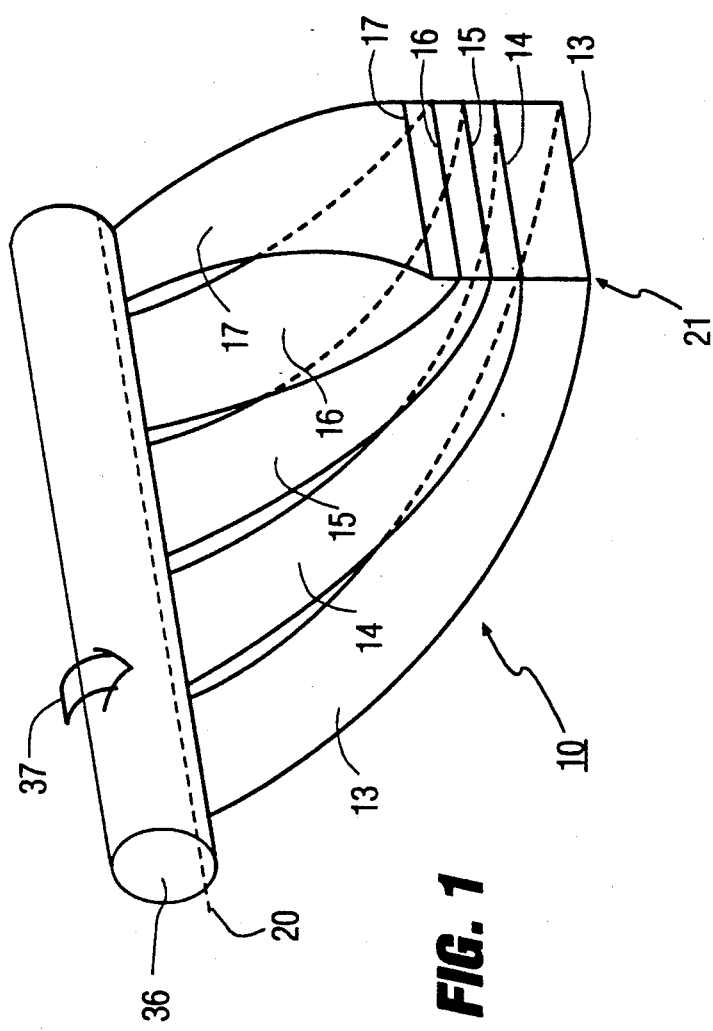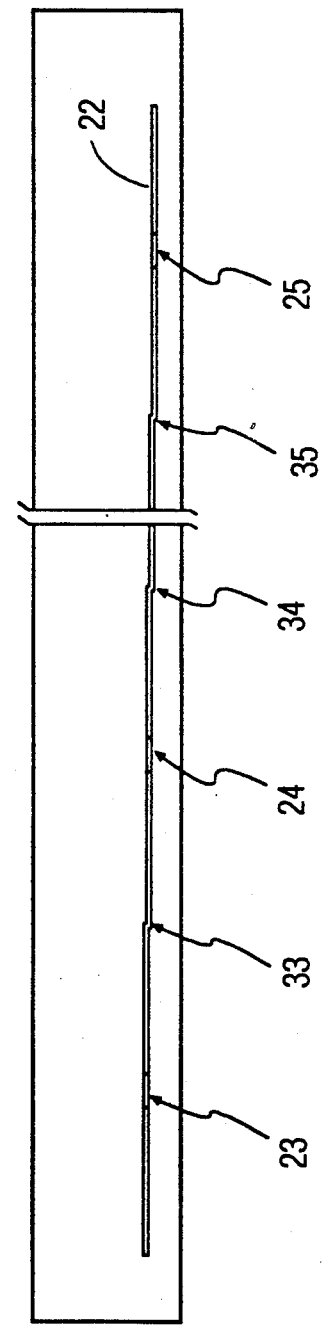

FIBER OPTIC BUNDLE AND METHOD OF MANUFACTURE

FIELD OF THE INVENTION

This invention relates to fiber optic bundles and more particularly to such bundles which have the fibers arranged in different geometries at the first and second faces of the bundle.

BACKGROUND OF THE INVENTION

U.S. Pat. Ser. No. 4,674,834 issued Jun. 23, 1987 discloses an electronic scanner and a printer which employ fiber optic bundles. The bundle has its fibers arranged in a linear array in a first face and in an area array in a second face. In operation as a scanner, light is directed at a paper and the linear end, having a length which can scan an 8.5 inch width of a paper, is moved incrementally with respect to the paper from one linear scan position to the next. Pixels transmitted by the fibers are sensed by a sensor array optically coupled to the area face.

In operation as a printer, an array of light sources is coupled to the area face of the bundle and the linear face is optically coupled to a photosensitive medium such as an electrostatic medium or photosensitive. An array of light sources generates patterns of pixels which are transferred to the photosensitive medium, line-by-line, for later transfer to paper by the familiar xerographic process.

A large number of fibers is necessary in order to achieve commercially acceptable resolution using fiber optic bundles. For example, for three hundred dots per inch resolution, for an eight and one half inch wide document, 2,650 fibers are required; for six hundred dots per inch, over 5,100 are required. It has been found that the manufacture of such fiber optic bundles is costly not only because of fiber breakage, but also because of the initialization procedure necessary to identify the relationships between the fiber ends of the two faces of a (noncoherent) fiber optic bundle as explained in that patent.

Copending patent application Ser. No. 532,932 (now U.S. Pat. No. 5,155,790) filed Jun. 4, 1990 and assigned to the assignee of the present application discloses a fiber optic bundle which has the fiber ends arranged in a linear array in a first face and in an area array in a second face. But the bundle is composed of ribbons of fibers. That is to say, each ribbon is composed of a plurality of fibers arranged in parallel. Each fiber is capable of transmitting multiple pixels. In addition, the application discloses an embodiment in which each fiber in each ribbon is a multicore fiber composed of rows and columns of fibers, each also capable of conducting light, but each of a diameter small compared to the pixel size (the light source image).

The fiber optic bundle is constructed with such ribbons by abutting ribbons in a side-by-side arrangement to form the linear face of the bundle. The area face is formed by stacking the opposite ends of the ribbons one on top of the other. Particularly if care is taken, for example, to arrange the ribbons so that consecutively numbered ribbons, for example, from left to right in the linear face, correspond to the order from bottom to top in the area face, initialization is at least simplified if not obviated because the relationships between fiber ends is ordered.

Also, breakage is reduced because ribbons are stronger and easier to handle. Still, great care is required in the construction of the bundles to ensure that the ribbons align with one another and the spacings between the ribbons are uniform. Otherwise, the bundle does not transmit an image faithfully.

In the operation of a printer which is composed of ribbons of fibers of this type, light is directed from a plurality of light sources to an oscillating mirror which moves the (changing) image of the light sources along an axis perpendicular to the axis of the of the ribbons. Thus, in practice, twenty-four light emitting diodes LED's direct light towards the mirror which reflects the image at consecutive, like-numbered fibers in twenty-four ribbons. Thus, an on-off pattern of light from the LED's is directed at the first fibers of the ribbon, then the second fibers, then the third . . . etc.

As the succession of patterns are thus generated, the photosensitive drum juxtaposed with the linear face of the bundle is moving. Thus, the consecutive pixels within a ribbon are tilted, with respect to the initial intended line of the drum to an extent which is a function of the speed of rotation of the drum, leading to an undesirable misalignment of pixels.

BRIEF DESCRIPTION OF ILLUSTRATIVE EMBODIMENTS OF THE INVENTION

In accordance with the principles of the present invention, a rigid frame is employed to receive the ribbon ends in the linear face of the fiber optic bundle. The frame may be made of metal, but preferably is of glass. The frame is constructed in a saw tooth configuration, with wide teeth, each of a dimension to correspond to the width of a ribbon. Moreover, although the "linear" face of the fiber optic bundle is essentially linear, each ribbon has one edge thereof offset from its other edge in a direction opposite to the movement of the photosensitive drum. The offset is related to the velocity of the moving drum. In accordance with the equation:

$$\text{vertical displacement} = \frac{\text{drum speed} \times \text{printing line time}}{m}$$

Where m is the number of ribbons. In this manner, any misalignment of pixels, due to drum movement during continuous printing is eliminated. Only in printers using fiber optic ribbons can the physical offset of one end of each of a plurality of ribbons, which form the linear face of a fiber optic bundle, compensate for such pixel misalignment.

BRIEF DESCRIPTION OF THE DRAWING

FIG. 1 is a plan view of a fiber optic bundle composed of ribbons in accordance with the principles of this invention; and FIG. 2 is a front view of a jig or frame for forming the linear face of the bundle of FIG. 1.

DETAILED DESCRIPTION OF AN ILLUSTRATIVE EMBODIMENT OF THE INVENTION

FIG. 1 shows a fiber optic bundle 10 comprising a plurality of, illustratively five, fiber optic ribbons 13, 14, 15, 16 and 17. The ends of the ribbons are set in fixed positions in a side-by-side arrangement to form a linear first face as indicated at broken line 20. Line 20 is to indicate the axis of the linear end. The opposite ends of the ribbons are stacked one on top of the other to form an area face designated 21 in FIG. 1.

Only five ribbons are shown in FIG. 1. In practice 24 ribbons are employed (for a 600 dpi bundle) each comprising approximately 106 multi-core fibers.

FIG. 2 shows a frame 22 employed to receive the ribbons at linear face 20 of FIG. 1. The frame conveniently is made of UV-sensitive glass or glass-ceramic available from Corning under the trademark Photoform although metal jigs have also been used. The glass is exposed to a pattern of light and then etched to remove the exposed regions of the glass to form the slots for receiving ribbons.

Specifically, frame 22 of FIG. 2 includes a plurality of slots, 23, 24 and 25 which represent the actual twenty-four slots employed for 600 dots per inch (dpi) resolution for an eight and a half inch document. The frame includes a plurality of steps 33, 34, 35. Each step is of a depth to compensate for any motion of an electrostatic drum to which the linear end is coupled in a printer during a print operation.

FIG. 1 shows the photoelectric drum 36 moving in a direction indicated by arrow 37. During the time that is required to transmit the pixels for an entire scan line, the drum moves downward, as viewed, forty-two microns for an assumed average drum speed. Since consecutive pixels for the ribbons are transmitted simultaneously, the pixels for each of the ribbons becomes successively misaligned because of drum movement. In order to compensate for the resulting misalignment of pixels, each fiber ribbon is elevated by frame 22 forty-two microns on the right side along the linear face as viewed in FIG. 1 for a printer operating at four pages per minute.

The frame of FIG. 2, holds the ribbons so that the right end of each is higher than the left end by forty-two microns and the steps 33, 34 - - - 35 are forty-two micron steps to place the next adjacent left end of a ribbon back in registry with the instant line of the document to be printed. If a matrix light source array or a linear light source array is used to generate pixels at the area face of FIG. 1, the pixels for all the fiber ribbons are transmitted simultaneously at the same time. Thus, the left to right elevation of the ribbons, as described, corrects for all misalignments simultaneously for assumed downward movement of the drum.

The invention has been described in terms of a sawtooth-shaped frame which "tilts" each ribbon of the linear face so that one edge of each ribbon is offset vertically from the horizontal axis of the linear end in a manner to compensate for movement of the associated photoelectric drum during the transmission of the pixels of a linear print segment of a document. Copending application Ser. No. 07/735,288 filed Jul. 24, 1991 assigned to the assignee of the present application discloses a frame for the area face of the fiber optic bundle. The frame for the area face comprises a set of separators between which the ribbon of the fiber optic bundle are inserted to form the area face of the bundle. The pixel tilt for compensating for drum movement as required herein can be achieved also by tilting the separators in the area face rather than tilting the segments of the linear face frame. In either case, the fiber optic bundle, in accordance with the principles of this invention, includes frame means for transmitting through each ribbon to the moving drum pixels which are offset from one edge of the ribbon to the other, a distance to compensate for drum rotation during each linear scan segment.

What is claimed is:

1. Apparatus including a plurality of optical fibers, said fibers being formed into m ribbons, each of said ribbons including a plurality of fibers, said ribbons being formed into a bundle having a linear first face and an area second face, said ribbons being joined to one another in a side-by-side relationship along a horizontal axis to form said first face, said ribbons being stacked one on top of the other to form said second face, rigid frame means for holding each of said ribbons in said linear first face in a tilted position with respect to said horizontal axis for transmitting to a photoresponsive medium, moving along a second axis which is at an angle with respect to said horizontal axis, a set of pixels for each of said ribbons in a manner to ensure alignment of said set of pixels on the moving photoresponsive medium.

2. Apparatus as set forth in claim 1 wherein said rigid frames means including a slot, wherein said slot includes segments, each of said segments being of a sawtooth geometry to accept one of said ribbons and having a geometry wherein one edge of said ribbon is offset with respect to the respective other edge along an axis perpendicular to said horizontal axis in a manner to compensate for said movement of said medium.

3. Apparatus as set forth in claim 2 wherein said medium comprises a photoresponsive drum.

4. Apparatus including a plurality of optical fibers, said fibers being formed into m ribbons, each of said ribbons including a plurality of fibers, said bundle having a linear first face and an area second face, said ribbon being joined to one another in a side-by-side relationship along a horizontal axis to form said first face, said ribbons being stacked one on top of the other to form said second face, said apparatus also including a rigid frame for said first face, said frame including a slot having a plurality of segments, each of said segments being of a geometry to accetp one of said ribbons, like ends of consecutive ones of said segments being offset vertically from the respective other ends of said segments by one fiber width.

5. Apparatus as set forth in claim 4 wherein said fibers are multicore fibers.

6. Apparatus as set forth in claim 5 wherein said frame is composed of glass.

7. Apparatus as set forth in claim 4 wherein $m > 1$.

8. Apparatus as set forth in claim 4 wherein said fibers are multicore fibers.

* * * * *